US012739693B2

(12) United States Patent
Sana

(10) Patent No.: US 12,739,693 B2
(45) Date of Patent: Sep. 15, 2026

(54) METHOD FOR THE CONJOINT COMMUNICATION AND SENSING OF THE ENVIRONMENT OF A NETWORK NODE

(71) Applicant: COMMISSARIAT A L'ENERGIE ATOMIQUE ET AUX ENERGIES ALTERNATIVES, Paris (FR)

(72) Inventor: Mohamed Sana, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 340 days.

(21) Appl. No.: 18/395,850

(22) Filed: Dec. 26, 2023

(65) Prior Publication Data

US 2024/0214861 A1 Jun. 27, 2024

(30) Foreign Application Priority Data

Dec. 27, 2022 (FR) ..................................... 22 14562

(51) Int. Cl.
*H04W 28/02* (2009.01)
*H04W 4/38* (2018.01)
(Continued)

(52) U.S. Cl.
CPC ......... *H04W 28/0236* (2013.01); *H04W 4/38* (2018.02); *H04W 24/08* (2013.01); (Continued)

(58) Field of Classification Search
CPC ......... H04W 28/0236; H04W 28/0226; H04W 36/32; H04W 84/18; H04W 24/08; H04W 4/38
(Continued)

(56) References Cited

U.S. PATENT DOCUMENTS 10,877,430 B2 * 12/2020 Rodel ................ G03G 21/1892
12,361,236 B2 * 7/2025 Butler .................. G06Q 10/087
(Continued)

FOREIGN PATENT DOCUMENTS

WO WO 2014/204171 A1 12/2014

OTHER PUBLICATIONS

Zhang et al., "Perception Mobile Networks: Cellular Networks With Radio Vision via Joint Communication and Radar Sensing", IEEE Vehicular Techonolgy Magazine, 2026 (Year: 2026).*
(Continued)

*Primary Examiner* — Omer S Mian
(74) *Attorney, Agent, or Firm* — Oblon, McClelland, Maier & Neustadt, L.L.P.

(57) ABSTRACT

The present invention relates to a conjoint communication and sensing method for detecting the movement of an obstacle in the environment of a node in a wireless telecommunication network and, where applicable, localising this obstacle. The node divides its environment into angular sectors and measures, at a plurality of observation instants, a quantity characteristic of the signal-to-noise-plus-sector-interference ratio in each of these sectors (410-420) to form a sensing matrix ($\Gamma_{\tau,n}(t)$). A blind separation of sources is implemented to extract from this matrix a matrix of sector contributions $$\left(\Gamma_{\tau,n}^{(\cdot)}(t)\right)$$

of the interfering signals (430). The movement of any obstacle is detected from the history of the sector contributions (440), which makes it possible, where applicable, to
(Continued)

predict a blockage situation (450) and to modify the allocation of the radio resources accordingly (460).

10 Claims, 6 Drawing Sheets

(51) Int. Cl.
*H04W 24/08* (2009.01)
*H04W 36/32* (2009.01)
*H04W 84/18* (2009.01)

(52) U.S. Cl.
CPC ....... *H04W 28/0226* (2013.01); *H04W 36/32* (2013.01); *H04W 84/18* (2013.01)

(58) Field of Classification Search
USPC ...................................... 370/329, 328, 310.2
See application file for complete search history.

(56) References Cited

U.S. PATENT DOCUMENTS

2012/0092211 A1 4/2012 Hampel et al.
2016/0119936 A1 4/2016 Kim et al.
2018/0027572 A1 1/2018 Kim et al.
2018/0034603 A1* 2/2018 Xiao .................... H04L 1/0009
2018/0069639 A1 3/2018 Chakraborty et al.
2018/0069681 A1 3/2018 Chakraborty et al.
2018/0070363 A1 3/2018 Chakraborty et al.
2019/0364492 A1* 11/2019 Azizi ................ H04W 52/0264
2020/0205062 A1 6/2020 Azizi et al.
2022/0279361 A1* 9/2022 Friday ..................... H04W 4/80
2023/0138578 A1 5/2023 Azizi et al.
2024/0411004 A1* 12/2024 Yao ......................... G01S 7/006
2025/0158693 A1* 5/2025 Chukka .................. H04B 7/088

OTHER PUBLICATIONS

Xie et al., "Collaborative Sensing in Perceptive Mobile Networks: Opportunities and Challenges.", IEEE, 2022 (Year: 2022).*
Zhang et al., "Enabling Joint Communication and Radar Sensing in Mobile Networks—A Survey" IEEE, 2022 (Year: 2022).*
Armeniakos, et al., "Stochastic Geometry for Modeling and Analysis of Sensing and Communications: A Survey", IEEE 2026 (Year: 2026).*
Preliminary French Search Report issued May 25, 2023 in French Application 22 14562 filed on Dec. 27, 2022, 12 pages (with English Translation of Categories of Cited Documents & Written Opinion).
Tsang et al., "Detecting Human Blockage and Device Movement in mmWave Communication System", GLOBAL Telecommunications Conference (GLOBECOM 2011), 2011 IEEE, 6 pages.

* cited by examiner

METHOD FOR THE CONJOINT COMMUNICATION AND SENSING OF THE ENVIRONMENT OF A NETWORK NODE

CROSS-REFERENCE TO RELATED APPLICATION

The present application is based on and claims the benefit of priority to French Application FR 2214562 filed on Dec. 27, 2022. The entire content of this application is incorporated herein by reference.

TECHNICAL FIELD

The present invention relates to the field of environment sensing in a telecommunication network, in particular for radio resource management (RRM). One particular embodiment also relates to the field of distributed learning.

PRIOR ART

With the deployment of 5th-generation (5G) cellular networks, radio resource management techniques have had to evolve in order to take into account new cases of use having recourse to services that are highly heterogeneous in terms of quality of service (QOS). Thus RRM techniques now use more and more complex strategies combining power allocation, beam formation, allocation of transmission resources (time intervals, frequencies, codes), etc to be able to satisfy such heterogeneity. In such a context, it is important to be able to sense the environment of the various nodes in the network (UEs and base stations) and to predict changes therein, knowledge of this environment making it possible to finely manage the radio resources of the network in terms of time and space. Thus, for example, in a 5G cellular network where the communications in the millimetric band may be subject to strong attenuation in the case of blockage, predicting the change in the environment makes it possible to anticipate the loss of QoS due to weakening of a radio link in this band and to take steps to remedy this, in particular by initiating a handover procedure in good time. More widely, it may also make it possible to optimise, according to circumstances, the quality of service in certain communications, to reduce the frequency of handover operations, and to minimise the energy consumption of certain nodes or of certain types of node.

The environment of the nodes of a network can be sensed by equipping these nodes with a radar device, so that they have a dual functionality of communication and radar sensing. In this case, a node can be equipped with distinct communication and radar devices or even an integrated communication and radar sensing (C&S) system, using the same radio resource or distinct radio resources for the radar function and the radio communication function. A description of the various possible variant embodiments of nodes with dual functionality can be found in the article by J. A. Zhang et al. entitled "Perceptive mobile network: a cellular network with radio vision via joint communication and radio sensing", published in IEEE Vehicular Technology Magazine, vol. 16, No 2, pp. 20-30, June 2021.

In general terms, radar sensing of the environment by a node with dual functionality is based on conventional techniques of measuring angle of arrival (AoA), time of flight or ToF and received signal strength or RSS to locate the radio-propagation obstacles. However, it does not exploit (or does so only little) the measurements coming from the radio communication and supposes to significantly modify the architecture of the nodes, which makes retrofitting complex and expensive.

The object of the present invention is to propose a method for the conjoint communication and sensing of the environment of a network node relying only on the measurements coming from the radio system, without adding a radar device and without complex modification to the architecture of the node.

DESCRIPTION OF THE INVENTION

The present invention is defined by a conjoint communication and sensing method for sensing the movement of an object in the environment of a node, referred to as the reference node, of a wireless communication network, said reference node having previously established a radio link with a sending node of the network, said method being original in that the reference node:

- determines a plurality of non-overlapping angular sectors in said environment and the vertex of which is the reference node, as well as a plurality of observation instants;
- makes, in each of the observation instants, a measurement of a quantity characteristic of a signal-to-noise-plus-sector-interference ratio on said radio link, for each of the angular sectors, and constructs a sensing matrix $$\left(\Gamma_{\tau,n}(t), \Gamma_{\tau,n}^{j_0}(t)\right)$$

the elements of which are the measurements of said characteristic quantity;

- implements a blind separation of sources using said sensing matrix and extracts therefrom a matrix of sector contributions $$\left(\Gamma_{\tau,n}^{(\cdot)}(t), \Gamma_{\tau,n}^{j_0{}^{(\cdot)}}(t)\right)$$

of interfering signals in the various angular sectors;

- detects the movement of any obstacle in the environment of the reference node from at least one history of said sector contributions.

Advantageously, a situation of blockage of said link is predicted from characteristics of the movement of the obstacle in the environment of the reference node.

When such a situation of blockage of said link is predicted, a modification of the radio resources in the network is implemented.

Typically, the blind separation of sources is implemented by means of a singular value decomposition of the sensing matrix or a principal components analysis.

According to a second embodiment, the reference node determines the nodes of its neighbourhood and makes a simultaneous mapping and localisation on said environment using the matrix of sector contributions that it has extracted as well as matrices of sector contributions that it has received, in the form of messages, from the nodes of its neighbourhood.

Advantageously, a mapping dictionary is constructed and updated, each entry in the dictionary corresponding to the intersection of a plurality of angular sectors the vertices of which are the reference node or nodes of its neighbourhood, each entry containing a signature consisting of the sector contributions of the angular sectors involved in the intersection associated with said entry.

In the event of modification of at least one signature in the mapping dictionary between two observation instants, a change is detected and a reallocation of radio resources of the network is implemented.

Alternatively, a Kullback-Leibler divergence is calculated between the distribution of the signatures at a current observation instant and that of a previous observation instant, over the whole of the mapping dictionary or a part thereof, and a reallocation of radio resources of the network is implemented when the Kullback-Leibler divergence exceeds a predetermined threshold.

The neighbourhood of the reference node can be obtained by making a preselection of nodes of the network by means of a random sampling or a K-nearest neighbours method, then a calculation, for each node thus preselected, of a score from its matrix of sector contributions and that of the reference node, the neighbourhood of this node being determined by the preselected nodes the score of which exceeds a predetermined threshold or by the M nodes having the highest scores, where M is a non-zero integer.

The score of a preselected node can be calculated by means of a cosine similarity metric, a Kullback-Leibler divergence or an attention mechanism or by a neural network implementing a classification operation.

BRIEF DESCRIPTION OF THE DRAWINGS

Other features and advantages of the invention will emerge from the reading of a preferential embodiment of the invention, described with reference to the accompanying figures, among which.

DETAILED DESCRIPTION OF PARTICULAR EMBODIMENTS

Hereinafter, a network of wireless communication nodes, not necessarily cellular, will be considered, wherein a first node has established a communication with a second node by means of a link, said link being interfered with by signals sent by third-party nodes, where applicable reflected by the environment or even by reflective surfaces (Reflective Intelligent Surfaces).

Without loss of generality, and for reasons of simplification of the presentation of the invention, we shall suppose that this telecommunication network is cellular, that the first node is an item of user equipment, UE, typically a mobile terminal, and that the second node is a base station, BS, serving this node. The present invention can in particular be applied to the 5G cellular network, in particular for communications in the millimetric domain or in the THz domain.

We shall consider any node in the network, for example an item of user equipment UE, and shall take it as the reference node. It is clear however that this node can alternatively be a base station, BS, of the network.

The idea at the basis of the present invention is to benefit from the spatial interference affecting the reference node and from the variation in this interference over time to deduce therefrom information with regard to the presence of any moving obstacles present in the neighbourhood of this node. More precisely, the reception of a communication by the reference node (via a downlink in the case of a UE and an uplink in the case of a BS) can be affected by interferences due to the reception of signals sent by the nodes located in the neighbourhood of this node.

Figure 1:
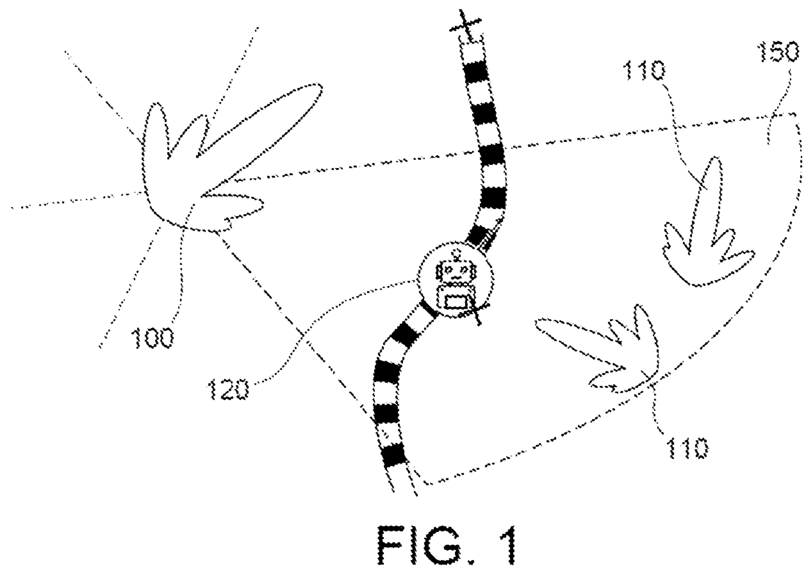
FIG. 1 illustrates schematically an interference situation in a telecommunication network.

This situation is illustrated in the example shown in FIG. 1. The reception diagram of the antenna of the reference node, 100, also has a main lobe pointing towards the base station, secondary lobes able to receive the signals sent by neighbouring nodes such as 110. If an obstacle, 120, moves in the neighbourhood of the reference node, the interference situation changes over time. In general terms, spatial interferences due to communications of the neighbouring nodes and fluctuations in these interferences over time can provide information on the presence and movement of obstacles in the neighbourhood of the reference node. Whilst the phenomenon of spatial interference degrades the quality of the radio communications and is combated for this reason, it is here usefully exploited to detect an activity in the environment of the reference node.

The reference node estimates a quantity characteristic of the signal-to-noise-plus-sector-interference ratio, for a plurality of sectors covering at least part of the neighbourhood of the reference node. Sector interference is defined here as the sum of the powers of the interfering signals received in a given angular sector, for example in the angular sector indicated at 150.

It is supposed, to illustrate the invention, that the nodes are distributed in a plane in accordance with a Poisson stochastic point process and that the channel between two nodes follows a Friis model, namely that the power PRx of the signal received by a receiving node is expressed using the power PTx sent from a sending node by means of:

[Math. 1]

$$P^{Rx} = h(t)\chi(t)P^{Tx}G^{Tx}G^{Rx}Cd^{-\eta} \tag{1}$$

where h(t) is a coefficient is the fading coefficient of the channel, $\chi(t)$ is a shadowing coefficient, $G^{Tx}$, $G^{Rx}$ are the respective antenna gains of the sender and of the receiver in the propagation direction, C is an attenuation constant, d is the distance between the sending and receiving nodes and $\eta$ is a transfer exponent on the propagation path.

It is clear for a person skilled in the art that other channel models can be used without departing from the scope of the present invention.

Figure 2:
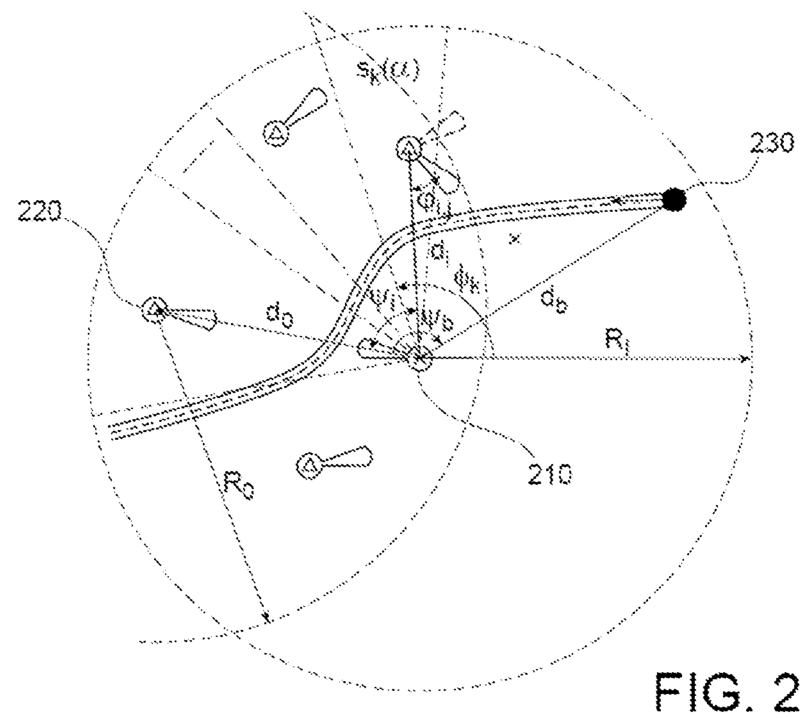
FIG. 2 shows a model illustrating the calculation of a signal-to-noise-plus-sector-interference ratio.

FIG. 2 shows a model illustrating the calculation of a signal-to-noise-plus-sector-interference ratio.

In this model, the base stations are referenced by the index i and the user equipment by the index j.

The reference node, here an item of user equipment, 210, bearing the index $j_0$ receives a communication signal from a sending node, here a base station BS, 220, bearing the index $i_0$. The communication is established on a downlink between the base station $i_0$ and the user equipment $j_0$.

It is supposed that the main sending lobe of the base station and the main reception lobe of the UA are aligned, i.e. the formation of the beam is optimum. In this configuration, the antenna gains in sending and receiving are respectively denoted $$G_m^{Tx} \text{ and } G_m^{Rx}$$

and the power of the communication signal received by the reference node is none other than:

$$P_{i_0,j_0}^{Rx} = P^{Tx} h_0(t)\chi_0(t) G_m^{Rx} G_m^{Tx} C d_0^{-\eta} \quad (2)$$

with the same notations as before and where the index 0 indicates that the quantities relate to the nodes $i_0$ and $j_0$. The distance do is the one separating the nodes $i_0$ and $j_0$.

The base stations other than the one serving the reference node are now considered, i.e. such that $i \neq i_0$. Each of these base stations is liable to cause spatial interference on the link between the nodes $i_0$ and $j_0$. The power of the interfering signal generated by the link between the node i (base station) and the node j (UE) on the link between the nodes $i_0$ and $j_0$ can be expressed in the following form:

$$P_{i-j,i_0-j_0}^{Rx} = P_i^{Tx} h_i(t)\chi_i(t) G^{Rx}(\theta, \psi_i) G^{Tx}(\upsilon, \varphi_{i,j}) C d_i^{-\eta} \quad (3)$$

where $d_i$ is the distance between the nodes i and $j_0$, $G^{Tx}(\nu, \varphi_{i,j})$ is the gain of the sending antenna of the base station i in the direction given by the angle $\varphi_{i,j}$, where $\nu$ is the angular width of the main lobe of the sending beam and $\varphi_{i,j}$ is the relative angle of departure (AoD) of the interfering signal with respect to the direction of this main lobe, $G^{Rx}(\theta, \psi_i)$ is the gain of the receiving antenna of the user equipment where $\theta$ is the angular width of the main lobe of the reception beam and $\psi_i$ is the relative angle of arrival (AoA) of the interfering signal with respect to the direction of this main lobe.

The total interfering signal on the downlink between the nodes $i_0$ and $j_0$, coming from a direction $\psi$, at the instant t, can then be written:

[Math.4]

$$I(\psi, t) = C\sum(i, j) \neq (i_0, j_0) P_i^{Tx} h_i(t)\chi_i(t) G^{Rx}(\theta, \psi_i) G^{Tx}(\upsilon, \varphi_{i,j_0}) d_i^{-\eta} \delta(\psi - \psi_i) \quad (4)$$

where δ(.) is the Dirac symbol. This spatial interference can be added on each sector. In other words, the sector interference $I_{s(\phi,\alpha)}(t)$, i.e. that generated by the nodes $i \in s(\phi, \alpha)$ where $s(\phi, \alpha)$ is the sector of angular width $2\alpha$ and of absolute angular orientation $\phi$, can be obtained by:

$$I_{s(\phi,\alpha)}(t) = \int_{s(\phi,\alpha)} I(\psi, t) d\psi \quad (5)$$

This sector interference, i.e. created by the nodes of the network belonging to a given angular sector and having the reference node as the vertex, makes it possible to define a quantity characteristic of the signal-to-noise-plus-sector-interference ratio:

$$\gamma_{s(\phi,\alpha)}(t) = \frac{P_{i_0,j_0}^{Rx}}{I_{s(\phi,\alpha)}(t) + N \cdot B_0} \quad (6)$$

where N is the noise spectral density and $B_0$ is the bandwidth used for the communication (downlink) between the nodes $i_0$ and $j_0$.

It should be noted that the sector interference $I_{s(\phi,\alpha)}(t)$ in a given sector depends on the time. If it is supposed that the sending beams of the various base stations are static in a given time range, the time variation of a sector interference results from a variation in configuration of the environment, for example the movement of an obstacle over time, as illustrated in FIG. 2 (movement of a robot, 230, through the sector $s_0$).

The neighbourhood of the reference node can be the subject of a division into continuous and non-overlapping angular sectors, not necessarily having identical angular widths. For reasons of simplification, we shall however suppose hereinafter that this division is implemented by means of n+1 sectors all having the same angular width $$2\alpha = \frac{2\pi}{n+1}$$

where n is a non-zero integer. The neighbourhood of the reference node is then partitioned into sectors $s_k$, k=0, . . . , n, the sector $s_0$ being defined as the one the orientation of which, $\phi_0$, corresponds to the link between the nodes $i_0$ and $j_0$, the other sectors shaving respective orientations $\phi_k = \phi_0 - 2\alpha \cdot k$.

For an observation time window ending at the time t and of duration τ, the values taken by said quantity characteristic of the signal-to-noise-plus-sector-interference ratio at the instants $$t - \tau + p\frac{\tau}{m}, \quad p = 0, \ldots,$$

m are collected, where $$\frac{\tau}{m}$$

is a detection period where m is a non-zero integer, and this for the various sectors covering the neighbourhood of the reference node, $s_k$, k=0, . . . , n.

In this way a sensing matrix of the environment of the reference node is obtained:

$$\Gamma_{\tau,n}(t) = \begin{pmatrix} \gamma_{s_0}(t-\tau) & \ldots & \gamma_{s_0}(t-\tau) \\ \vdots & \ddots & \vdots \\ \gamma_{s_0}(t) & \ldots & \gamma_{s_n}(t) \end{pmatrix} \quad (7)$$

When an obstacle is located in the environment of the reference node, this results in a modification of the signal-to-noise-plus-sector-interference ratio, this modification depending on the secondary lobe or lobes shadowed and on the shadowing coefficient. The resolution with which this obstacle can be sensed depends in particular on the angular width of the sectors and the density of the interfering nodes ($i \neq i_0$). It will be understood in fact that, the greater the density of the interfering nodes and the smaller the angular width, the better the spatial resolution.

In practice, the reception of the interfering signals and the integration of the sector interference in the various sectors take place in a manner multiplexed in time (TDD), by scanning in turn the various angular sectors. The refresh frequency can be adaptive according to the activity in the various angular sectors. In all cases, the refresh frequency in the various sectors can be selected so that the matrix $\Gamma_{\tau,n}(t)$ faithfully represents the signal-to-noise-plus-sector-interference ratio of the various sectors at the same observation instants.

According to a first embodiment, the sensing matrix can make it possible to sense the movement of an obstacle in the environment of the reference node. For this purpose, the measurements of the signal-to-noise-plus-sector-interference over time, in other words the row vectors of the sensing matrix, can allow a blind source separation. This is because a sensing matrix can be decomposed into three distinct components:

$$\Gamma_{\tau,n}(t) = \Gamma_{\tau,n}^{(0)}(t) + \Gamma_{\tau,n}^{(\cdot)}(t) + \Gamma_{\tau,n}^{(noise)}(t) \tag{8}$$

The first component, $$\Gamma_{\tau,n}^{(0)}(t),$$

corresponds to the contribution relating to static shadowing, the second component, $$\Gamma_{\tau,n}^{(\cdot)}(t),$$

corresponds to the contribution of moving obstacles in the environment of the reference node, and the third component, $$\Gamma_{\tau,n}^{(noise)}(t),$$

corresponds to the other contributions of noise such as random scattering and scattering.

The blind separation of sources makes it possible to isolate the various contributions to the sensing matrix, in particular that due to the moving obstacles. Various source-separation methods can be applied, for example singular value decomposition (SVD) of the sensing matrix or principal components analysis (PCA), in a manner known per se. For example, the sensing matrix, of size (m+1)×(n+1), can be the subject of an SVD decomposition:

$$\Gamma_{\tau,n}(t) = U \sum V^T \tag{9}$$

where U is a semi-unitary matrix of size (m+1)×r, V is a semi-unitary matrix of size (n+1)×r, and E is a diagonal square matrix of size r×r with $r=\mathrm{rank}(\Gamma_{\tau,n}(t)) \leq \min(m+1, n+1)$, the diagonal elements of E being the singular values $\sigma_1 \geq \sigma_2 \geq \ldots \geq \sigma_r$.

Equation (9) can also be written:

$$\sum_{\ell=1}^{r} \sigma_\ell u_\ell v_\ell^T = \sum_{\ell=1}^{\ell_0} \sigma_\ell u_\ell v_\ell^T = \sum_{\ell=\ell_0+1}^{\ell_1} \sigma_\ell u_\ell v_\ell^T + \sum_{\ell=\ell_1+1}^{r} \sigma_\ell u_\ell v_\ell^T \tag{10}$$

wherein the three adding terms appearing on the right correspond respectively to the components $$\Gamma_{\tau,n}^{(0)}(t),\ \Gamma_{\tau,n}^{(\cdot)}(t),\ \text{and}\ \Gamma_{\tau,n}^{(noise)}(t)$$

of the sensing matrix. This is because the matrix $$\Gamma_{\tau,n}^{(0)}(t)$$

corresponds essentially to an attenuation on the direct propagation path or the multi-paths, the second to the signals of the interferers in the neighbourhood and the third to a random noise (random scattering, thermal noise).

The ordered list of the singular values shows three different decrease regimes with changes of slope between successive regimes, which makes it possible to determine the indices $\ell_0$, and $\ell_1$, and therefore makes it possible to isolate the matrix $$\Gamma_{\tau,n}^{(\cdot)}(t) = \sum\nolimits_{\ell=\ell_0+1}^{\ell_1} \sigma_\ell u_\ell v_\ell^T.$$

Figure 3:
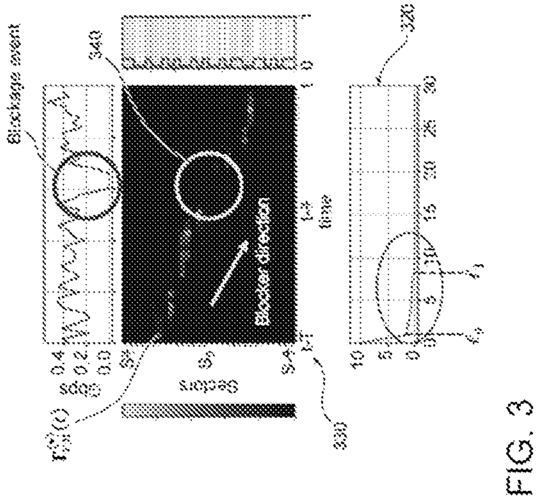
FIG. 3 shows an example of sensing of an obstacle in the environment of a node using a matrix representing the signal-to-noise-plus-sector-interference ratio over time.

The determination of the indices $\ell_0$, and $\ell_1$ from the sensing matrix has been illustrated in FIG. 3. The left-hand part of the figure, 310, shows (the amplitude) of the elements of the matrix $\Gamma_{\tau,n}(t)$, the sector index appearing on the Y-axis and the index of the instant of detection in the time window appearing on the X-axis. The right-hand part of the figure shows the result of the singular value decomposition. More precisely, the diagram 320 gives the singular values of the matrix, ordered by decreasing values, in which the aforementioned three decrease regimes can be distinguished. The elements of the matrix $$\Gamma_{\tau,n}^{(\cdot)}(t)$$

corresponding to the eigenvalues $\sigma_{\ell_0+1}$ to $\sigma_{\ell_1}$ are shown at 330. The indices of the sectors have been rearranged in ordinates to centre the diagram on the sector $s_0$. A blockage of the link corresponding to the appearance of an obstacle between the nodes $i_0$ and $j_0$ is noted at 340. This blockage can be anticipated since the obstacle first of all masks certain interference sources and therefore increases the signal-to-noise-plus-sector-interference ratio in certain sectors before the blockage in question. The chronological sequence of the sectors in which this ratio increases, and more generally the history of the signal-to-noise-plus-sector-interference ratio in the various angular sectors, makes it possible to estimate the trajectory (direction, angular velocity of the movement along the trajectory) and, where applicable, the apparent size of the obstacle in question.

The estimation of the trajectory and, where applicable, of the apparent size of the object makes it possible to anticipate the situation of blocking of the link and to manage the RRM resources accordingly, for example to prepare a handover for the reference node or to modify an allocation of resources.

Figure 4:
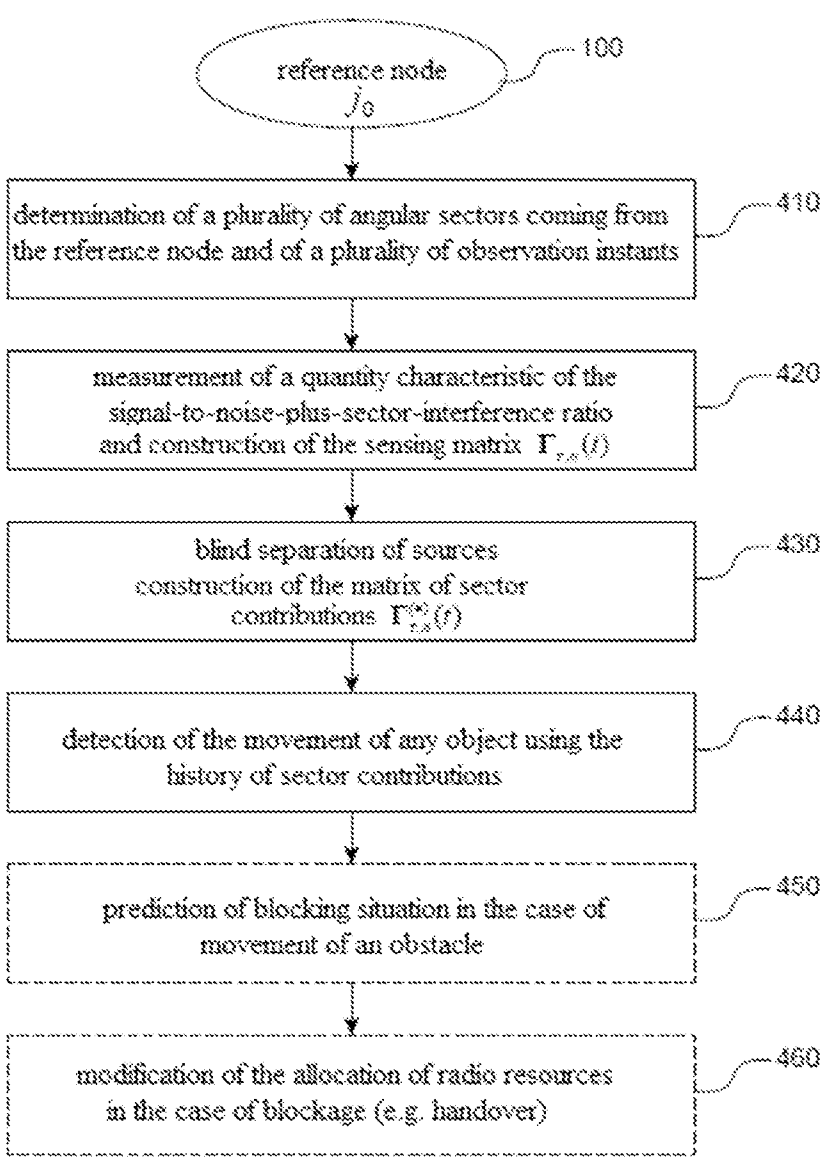
FIG. 4 shows, in the form of a flow chart, the principle of a conjoint communication and environment-sensing method, according to a first embodiment of the invention.

FIG. 4 shows the principle of a conjoint communication and environment-sensing method, according to a first embodiment of the invention.

In this embodiment, a reference node of a wireless telecommunication network makes the measurements of a quantity characteristic of the noise-to-sector-interference ratio in a plurality of non-overlapping angular sectors covering the neighbourhood of this node and detects the movement of any object in this neighbourhood. Optionally, this detection enables the network to manage its radio resources, for example by preparing a handover or by modifying an allocation of resources.

At step 410, the reference node, $j_0$, having previously established a communication with a sending node, $i_0$, defines a plurality of non-overlapping angular sectors of which it is the origin, and a plurality of observation instants, for example by determining a sector angular width, $\alpha$, or a given number of sectors, n+1, as well as a number m+1 of observation instants in a time window of duration $\tau$.

At step 420, the reference node, at each observation instant and for each angular sector, makes a measurement of a quantity characteristic of the signal-to-noise-plus-sector-interference ratio. From these measurements it constructs a matrix $\Gamma_{\tau,n}(t)$ of size $(n+1)\times(m+1)$.

At step 430, the reference node implements a blind separation of sources using the measurements made. This separation can be implemented by means of a principal components analysis or by means of a singular value decomposition of the sensing matrix. At step 430, the reference node determines, among the sources determined at the previous step, those that correspond to interferences due to signals sent by nodes belonging to the neighbourhood of the reference node. For example, when the separation of sources is implemented by means of an SVD decomposition, this determination can be made by identifying breaks in slope in the series of singular values according to the observation instant. The matrix $$\Gamma_{\tau,n}^{(\bullet)}(t)$$

corresponding to the contribution of the interferences generated by the nodes in the neighbourhood is deduced therefrom, to the matrix at $\Gamma_{\tau,n}(t)$. More precisely, the matrix $$\Gamma_{\tau,n}^{(\bullet)}(t)$$

supplies, at each observation instant, the sector contributions of the nodes in the neighbourhood to the sensing matrix.

At step 440, the reference node senses, from the history of the sector contributions, the movement of any obstacle in the neighbourhood of the reference node. At step 450, if a movement is sensed at the previous step, the reference node makes a prediction of occurrence of a blocking situation from the characteristics of this movement.

At step 460, if a blocking situation is predicted by the reference node, the network implements a modification of the allocation of the radio resources, example implements a handover, a sending beam switching.

Steps 450 and 460 are optional since the reference node can, in some applications, limit itself to sensing the movement of an obstacle in its environment.

In a second embodiment of the invention, the reference node, by virtue of the cooperation of its neighbouring points, senses the position of an obstacle in its environment.

Figure 5:
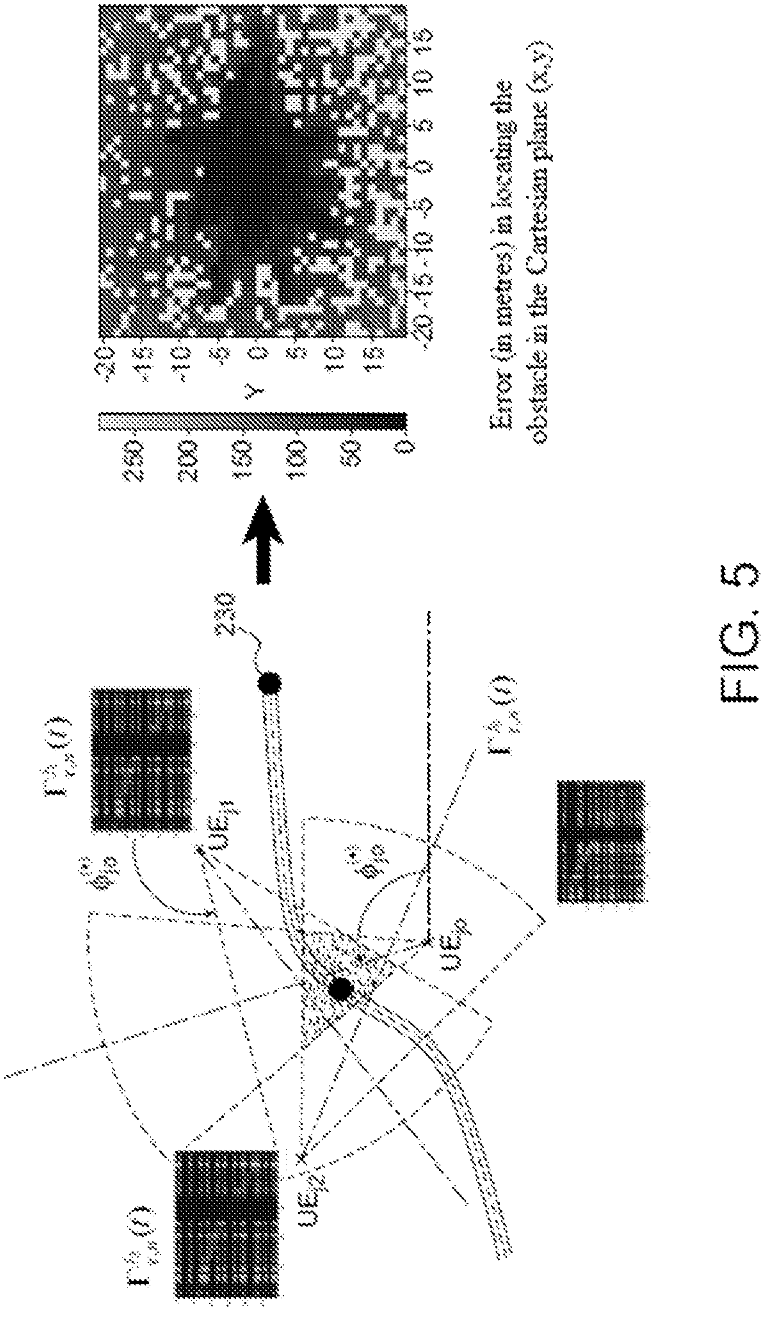
FIG. 5 illustrates an example of cooperative sensing of the position of an obstacle in the environment of a reference node using the measurement matrices obtained by various nodes in the neighbourhood of this reference node.

FIG. 5 illustrates an example of cooperative sensing of the position of an obstacle in the environment of a reference node using the sensing matrices obtained by various nodes in the neighbourhood of this reference node.

In this embodiment, the reference node, $j_0$, makes measurements of a quantity characteristic of the signal-to-noise-plus-sector-interference ratio in a plurality of angular sectors and a plurality of observation instants in a time window. It deduces therefrom a sensing matrix, denoted $$\Gamma_{\tau,n}^{j_0}(t),$$

as in the first embodiment. Unlike the first embodiment, however, the nodes of a neighbourhood of $j_0$, within the meaning defined below, also each make measurements of said quantity characteristic of the signal-to-noise-plus-sector-interference ratio in a plurality of angular sectors and deduce therefrom their own sensing matrices. In the case illustrated, the nodes $j_1$ and $j_2$ belong to the neighbourhood of the reference node and construct their respective sensing matrices $$\Gamma_{\tau,n}^{j_1}(t) \text{ and } \Gamma_{\tau,n}^{j_2}(t).$$

The reference node and the nodes belonging to the neighbourhood of this node implement a blind separation of sources as described previously, to obtain matrices of sector contributions denoted $$\Gamma_{\tau,n}^{j_0(\bullet)}(t), \Gamma_{\tau,n}^{j_1(\bullet)}(t), \Gamma_{\tau,n}^{j_2(\bullet)}(t).$$

The nodes $j_1$ and $j_2$ respectively transmit, in message form, the matrices $$\Gamma_{\tau,n}^{j_1(\bullet)}(t)$$

and $$\Gamma_{\tau,n}^{j_2(\bullet)}(t)$$

to the reference node. Alternatively, the reference node $j_0$ and the nodes belonging to its neighbourhood each transmits its matrix of sector contributions to an administrator node. From the chronological sequences of the sector contributions coming from the matrices $$\Gamma_{\tau,n}^{j_0(\cdot)}(t),\ \Gamma_{\tau,n}^{j_1(\cdot)}(t),\ \Gamma_{\tau,n}^{j_2(\cdot)}(t),$$

the reference node or, where applicable, the administrator node, implements simultaneous localisation and mapping (SLAM). A description of a simultaneous localisation and mapping method can be found in the article by H. Durrant-Whyte et al. entitled "Simultaneous Localization and Mapping: part I" published in IEEE Robotics & Automation Magazine, vol. 13, No 2, pp. 99-110. Being able to have available measurements coming from various "angles of view", or more precisely from various distinct angular sectors, the vertices of which are located at distinct points, enables the node responsible for the calculation to determine and localise any moving obstacle. The size of the intersections of the various angular sectors gives an estimation of the errors in localising an obstacle in the environment of the reference node (right-hand part of the figure).

Figure 6:
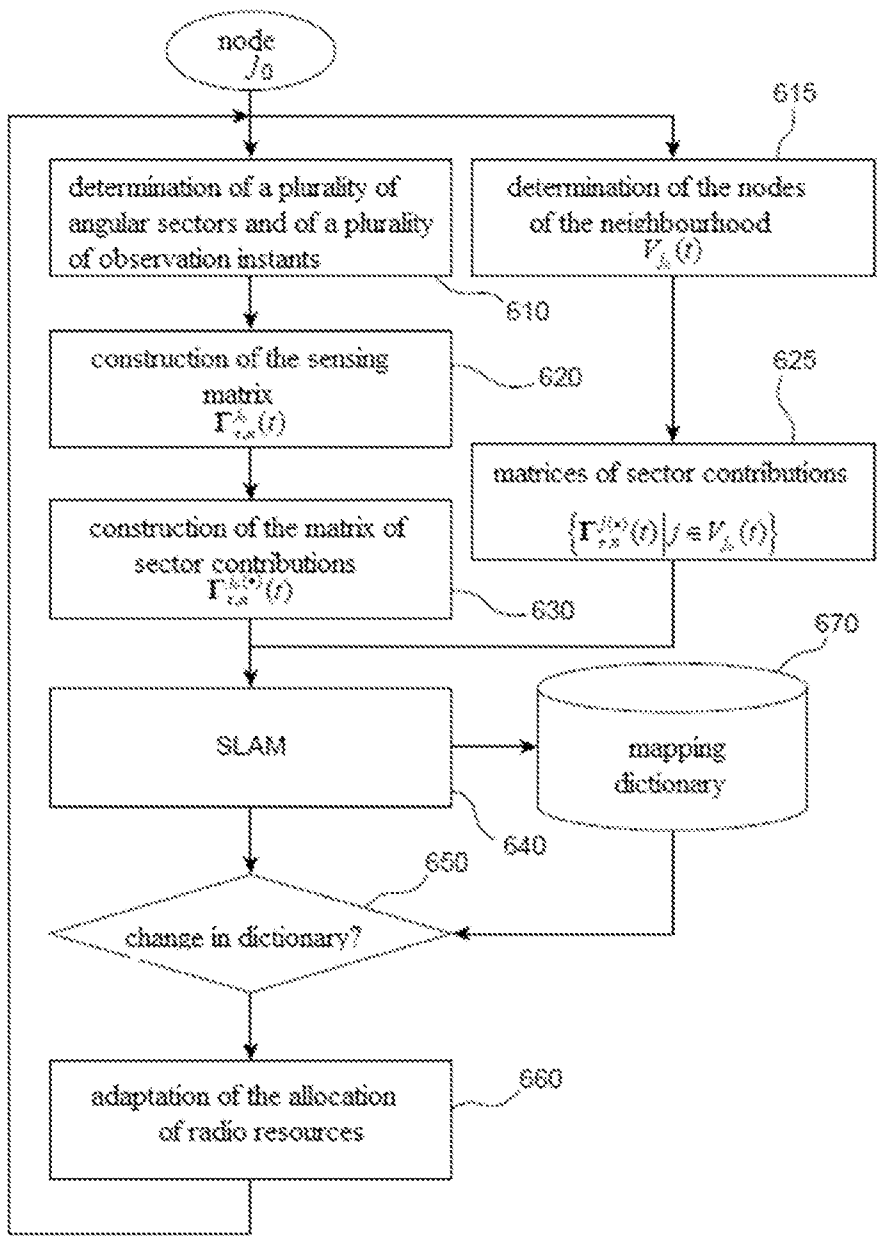
FIG. 6 shows, in the form of a flow chart, the principle of a conjoint communication and environment-sensing method, according to a second embodiment of the invention.

FIG. 6 details, in the form of a flow chart, a method for communicating and sensing the environment of a reference node, according to a second embodiment of the invention.

Sensing the environment of the reference node here aims to cooperatively estimate the position of a moving obstacle in the environment of the node in question.

As in the first embodiment, the reference node $j_0$ determines at 610 a plurality of angular sectors of which it is the vertex as well as a plurality of observation instants, and then measures, at 620, at each observation instant, a quantity characteristic of the signal-to-noise-plus-sector-interference ratio for each of said angular sectors, so as to construct the sensing matrix, $$\Gamma_{\tau,n}^{j_0}(t).$$

At 630, it makes a blind separation of sources, for example by means of a singular value decomposition, to obtain a matrix of sector contributions $$\Gamma_{\tau,n}^{j_0(\cdot)}(t).$$

In parallel, the reference node selects at 615, from the nodes in the network, those that belong to its neighbourhood, $V_{j_0}(t)$, in accordance with a selection algorithm described below, on the basis of the matrices of sector contributions $$\Gamma_{\tau,n}^{j(\cdot)}(t)$$

received in the form of messages from the set U of nodes in the network or even from a subset of these nodes.

At step 625, it takes into account only the matrices of sector contributions respectively obtained from the nodes in its neighbourhood, or in other words $$\Gamma_{\tau,n}^{j(\cdot)}(t)$$

with $j \in V_{j_0}(t)$.

At 640, the reference node (or the administrator node) executes a simultaneous localisation and mapping algorithm, SLAM, using all the sector contribution matrices $$\{\Gamma_{\tau,n}^{j_0(\cdot)}(t)\} \cup \{\Gamma_{\tau,n}^{j(\cdot)}(t) \mid j \in V_{j0}(t)\},$$

to determine the presence of any object in the environment of the reference node. The presence of an object is sensed by a signature formed by the respective sector contributions of angular sectors coming from the nodes $\{j_0\} \cup V_{j_0}(t)$ such that their intersection is non-void. The reference node (or the administrator node) produces and updates, at each sensing instant, a mapping dictionary, 670, the entries of which correspond to these intersections, each entry containing a signature, a signature consisting of the sector contributions of the angular sectors involved in the intersection associated with said entry.

At 650, the reference node (or the administrator node) determines, for each of the entries in the dictionary in question, whether a change of signature has occurred with respect to the previous detection instant. Alternatively, the determination of a change can be made over the whole of the dictionary or over only part, associated with a region in space, using the calculation of a Kullback-Leibler divergence between the distribution of signatures relating to the current observation instant and the distribution of signatures relating to the previous detection instant.

If such a change is detected, the network at 660 adapts its allocation of radio resources (RRM), for example makes a handover or a switching of a sending beam.

Figure 7:
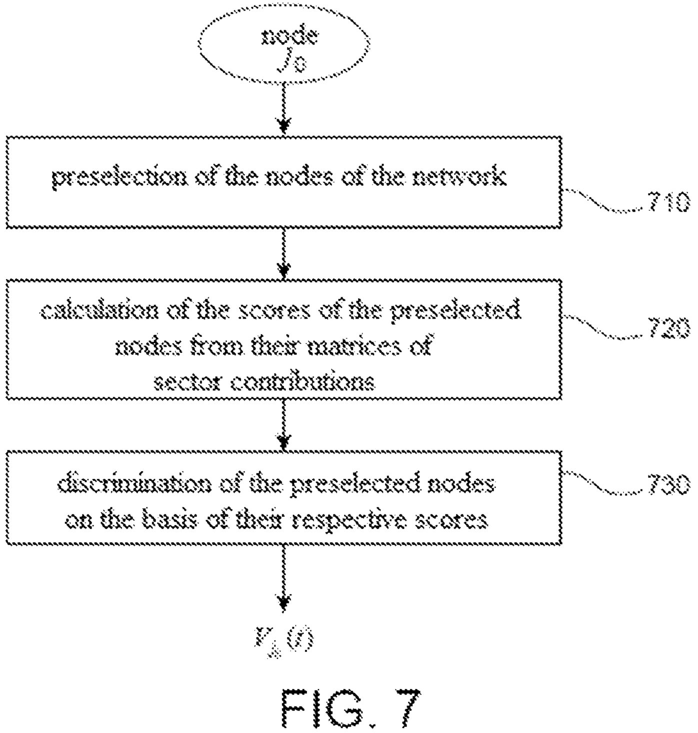
FIG. 7 details the step of determining the neighbourhood of a node in the flow diagram of FIG. 6.

FIG. 7 illustrates schematically the way in which the reference node determines the nodes that belong to its neighbourhood, $V_{j_0}(t)$, for each observation time window.

The neighbourhood of the node $V_{j_0}(t)$ can be determined by selecting (or by subsampling) from the set U of nodes in the network, or even a subset V thereof obtained previously in a network discovery phase, those the score of which is above a certain threshold.

At step 710, the reference node $j_0$ makes a preselection of the nodes in the network, for example by means of a random sampling. This preselection may alternatively have been obtained by a clustering method in the set U or V, for example a K-nearest neighbours method.

At step 720, a score is calculated for each of these nodes thus preselected.

The score of a node j is based on its local observation, $o_j$, this local observation being understood as the matrix of the sector contributions $$\Gamma_{\tau,n}^{j(\cdot)}(t)$$

coming from its sensing matrix $$\Gamma_{\tau,n}^{j}(t),$$

as well as the local observation $o_{j_0}$ of the reference node, i.e. the matrix of the sector contributions $$\Gamma_{\tau,n}^{j_0(\cdot)}(t).$$

The score of the node reflects the importance of this node in predicting the movement of an obstacle in the environment of the reference node $j_0$.

The score can be obtained from a cosine similarity metric, a Kullback-Leibler divergence, an attention mechanism, etc.

Alternatively, the score of a node can be given by a classification process, implemented by a neural network, supplying for each node the probability of the observation $o_j$ being in the same class as $o_{j_0}$. This classification process can be trained online in a centralised and supervised manner.

The reference node next makes, at 730, a discrimination of the preselected nodes on the basis of their respective scores. This discrimination can for example be made by retaining only the M nodes (M being a non-zero integer) that obtained the best scores or those that achieve a score above a certain threshold.

The nodes thus retained form the neighbourhood $V_{j_0}(t)$ of the reference node.

In the description of the invention, we have supposed that the network was deployed in a 2D space and that the angular sectors were defined in one plane. It is however clear for a person skilled in the art that the network can be deployed in a 3D space (in particular when it uses drones) and that the angular sectors can be defined by their angular extents in azimuth and elevation. Furthermore, the conjoint communication and sensing method of the present invention is not limited to sensing the movement of a single obstacle in the environment of the reference node, and that the movement of a plurality of objects can be sensed in the first embodiment, the localisation of the obstacles in addition being obtained in the second embodiment. Finally, we have supposed, in the description of the invention, that the interfering signals were sent by nodes in the network. When the spatial density of the nodes is insufficient, use can be made of intelligent reflecting surfaces (IRS) to artificially increase the density of these nodes by creating additional apparent nodes.

The invention claimed is:

1. Conjoint communication and sensing method for sensing a movement of an obstacle in an environment of a node, referred to as a reference node, of a wireless communication network, said reference node having previously established a radio link with a sending node of the network, said method comprising:

determining a plurality of non-overlapping angular sectors in said environment and vertices of which are the reference node, as well as a plurality of observation instants;

measuring, in each of the observation instants, a measurement of a quantity characteristic of a signal-to-noise-plus-sector-interference ratio on said radio link, for each of the angular sectors, and constructing a sensing matrix $$\left(\Gamma_{\tau,n}(t), \Gamma_{\tau,n}^{j_0}(t)\right),$$

the elements of which are the measurements of said characteristic quantity;

implementing a blind separation of sources using said sensing matrix and extracting, therefrom, a matrix of sector contributions $$\left(\Gamma_{\tau,n}^{(\cdot)}(t), \Gamma_{\tau,n}^{j_0(\cdot)}(t)\right)$$

of interfering signals in the plurality of angular sectors; and detecting the movement of the obstacle in the environment of the reference node from at least one history of said sector contributions.

2. Conjoint communication and sensing method according to claim 1, wherein a situation of blockage of said radio link is predicted from characteristics of a movement of the obstacle in the environment of the reference node.

3. Conjoint communication and sensing method according to claim 1, wherein, if such a situation of blockage of said radio link is predicted, a modification of radio resources in the network is implemented.

4. Conjoint communication and sensing method according to claim 1, wherein the blind separation of sources is implemented by means of a singular value decomposition of the sensing matrix or a principal components analysis.

5. Conjoint communication and sensing method according to claim 1, wherein the reference node determines nodes of its neighbourhood and makes a simultaneous mapping and localisation on said environment using the matrix of sector contributions that it has extracted as well as matrices of sector contributions that it has received, in the form of messages, from the nodes of its neighbourhood.

6. Conjoint communication and sensing method according to claim 5, wherein a mapping dictionary is constructed and updated, each entry in the dictionary corresponding to intersection of a plurality of angular sectors the vertices of which are the reference node or nodes of its neighbourhood, each entry containing a signature consisting of the sector contributions of the angular sectors involved in the intersection associated with said entry.

7. Conjoint communication and sensing method according to claim 6, wherein, in event of modification of at least one signature in the mapping dictionary between two observation instants, a change is detected and a reallocation of radio resources of the network is implemented.

8. Conjoint communication and sensing method according to claim 6, wherein a Kullback-Leibler divergence is calculated between distribution of the signatures at a current observation instant and that of a previous observation instant, over the whole of the mapping dictionary or a part thereof, and in that a reallocation of radio resources of the network is implemented when the Kullback-Leibler divergence exceeds a predetermined threshold.

9. Conjoint communication and sensing method according to claim 5, wherein the neighbourhood of the reference node is obtained by making a preselection of nodes of the network by means of a random sampling or a K-nearest neighbours method, then calculates, for each node thus preselected, a score from its matrix of sector contributions and that of the reference node, the neighbourhood of this node being determined by the preselected nodes the score of which exceeds a predetermined threshold or by the M nodes having the highest scores, where M is a non-zero integer.

10. Conjoint communication and sensing method according to claim 9, wherein the score of a preselected node is calculated by means of a cosine similarity metric, a Kullback-Leibler divergence or an attention mechanism or by a neural network implementing a classification operation.

* * * * *